United States Patent [19]
Simunovic

[11] Patent Number: 4,569,627
[45] Date of Patent: Feb. 11, 1986

[54] ROBOTIC MANIPULATOR

[76] Inventor: Sergio N. Simunovic, 15 Westchester Rd., Newton, Mass. 02158

[21] Appl. No.: 620,449

[22] Filed: Jun. 14, 1984

Related U.S. Application Data

[63] Continuation-in-part of Ser. No. 472,205, Mar. 10, 1983, abandoned, which is a continuation-in-part of Ser. No. 194,352, Oct. 6, 1980, abandoned.

[51] Int. Cl.[4] ............................................. B25J 11/00
[52] U.S. Cl. .................................. 414/735; 33/180 R; 414/729; 901/14
[58] Field of Search .................... 414/1, 4, 729, 730, 414/735, 754; 33/180 R, 185 R; 901/14, 18

[56] References Cited

U.S. PATENT DOCUMENTS

| | | | |
|---|---|---|---|
| 2,988,928 | 6/1961 | DeFonbrune et al. | 33/180 R X |
| 3,779,400 | 12/1973 | Brockman et al. | 414/730 |
| 4,407,625 | 10/1983 | Shum | 901/14 X |

FOREIGN PATENT DOCUMENTS

| | | | |
|---|---|---|---|
| 2750302 | 5/1979 | Fed. Rep. of Germany | 414/730 |
| 2800273 | 7/1979 | Fed. Rep. of Germany | 414/730 |
| 631329 | 11/1978 | U.S.S.R. | 414/4 |

*Primary Examiner*—Leslie J. Paperner
*Attorney, Agent, or Firm*—Cesari and McKenna

[57] ABSTRACT

A robotic manipulator has three linearly extensible arms mounted on a frame in a triangular array and carrying at their remote ends a connector interface coupling the arms to a tool for manipulating parts to be positioned or for other work. The structure is such that the location of the connector is determined solely by the lengths of the arms, while its orientation is determined primarily by controllably rotating the connector with respect to the arms. The decoupling of position and orientation minimizes the computation required to accurately position a tool. In the preferred illustrative embodiment, the rotation is performed by driving motors for the arms which are located at the arm ends adjacent the frame; this minimizes the mass, and thus the inertia, that is located at the connector end, and enables high acceleration and rapid motion of the connector head and its associated tool. Further, a three-point suspension for the arms provides high stiffness, thereby enabling the system to carry substantial loads at high speed and with good positioning and orientation accuracy.

63 Claims, 6 Drawing Figures

ROBOTIC MANIPULATOR

This application is a continuation-in-part of U.S. Ser. No. 472,205, filed Mar. 10, 1983, which is a continuation-in-part of U.S. Ser. No. 194,352 filed Oct. 6, 1980, both abandoned.

FIELD OF THE INVENTION

The invention relates to robotics and, more particularly, to robotic manipulators for robotic positioning and the like.

BACKGROUND OF THE INVENTION

Robotic positioning machines typically incorporate an articulated arm which moves throughout a defined volume for handling and assembling parts of various devices. These machines are used for various purposes, such as automatic assembly and numerically controlled machining, among others. Increasingly, such machines are placed under the control of a device such as a digital computer which controls the position and orientation of a manipulator element affixed to the arm. Examples of such machines are shown in U.S. Pat. No. 3,985,238 issued Oct. 12, 1976 to K. Nakura, et al and U.S Pat. No. 4,068,536 issued Jan. 17, 1978 to T. H. Stackhaus. These manipulators are essentially cantilevered arms incorporating a number of articulated and sliding joints to provide the requisite motion in space.

Among some of the more important characteristics of such machines are their load carrying capacity, their maximum operating speed (which, in large part, is a function of the inertia of the machine), and the simplicity of the machine, which not only affects its ease of use but also directly affects its cost. The load carrying capacity of many of the manipulators currently available, particularly those of the cantilevered arm type, are frequently quite limited in relation to the mass of the manipulator itself. Further, the construction of these manipulators is such as to create high translational and rotational moments of inertia with the result that the acceleration of the manipulator head, and thus the maximum speed of the manipulator itself, is unnecessarily limited. Further, their complexity frequently results in high cost, diminished reliability and consequent greater "down-time", and frequently an increased complexity of the control system for driving these machines.

BRIEF DESCRIPTION OF THE INVENTION

Accordingly, it is an object of the invention to provide an improved robotic manipulator.

Further, it is an object of the invention to provide a robotic manipulator of simple and efficient design.

Another object of the invention is to provide a robotic manipulator whose moveable portions have comparatively low inertia in relation to the load they can carry.

Yet another object of the invention is to provide a robotic manipulator whose construction minimizes the computation required to position the manipulator head at a desired location.

In accordance with the present invention, an articulated structure for robotic assembly and the like has three arms, each mounted on a frame for rotation (with respect to the frame) about first and second axes parallel to a plane transverse to the corresponding arm, and about a third axis transverse to that plane. In the preferred illustrative embodiment, the first and second axes are located in a plane transverse to (and preferably perpendicular to) the longitudinal axis of the arm and the third axis is coincident with the (longitudinal) arm axis. This has the advantage of simplifying the computations required in positioning the arms at a given location. In other illustrative embodiments, one or more of these axes are offset from the transverse plane for reasons described in connection with the particular embodiment.

In each embodiment, the arms terminate in a coupler carrying a connector including a connector head for attachment to a tool. The head is mounted to rotate (with respect to each arm) about one or more arm axes which comprise, for each arm, first and second axes parallel to a second plane transverse to the corresponding arm, and a third axis transverse to the second plane. The positional location and orientation of the connector head (and thus of any tool or part carried by the connector head) is defined by the longitudinal extension of each arm and by restricting rotation of the connector head with respect to the arm axes and thus the frame. The extension and rotation are established by control elements (e.g., motors) which respond to command or control inputs from the user, as well as by the structural interconnections. In the preferred embodiment, the rotation control elements are interposed between the arms and the frame and controlled rotation in response to control inputs is imparted to the head by causing the head to rotate with the arm about a given axis, usually one that is coincident with the arm. In alternative embodiments, the rotational control elements are interposed between the arms and the connector head. The latter embodiments are particularly useful for certain types of operations such as for high speed drilling operations or operations requiring movement of a relatively light tool over an extensive volume.

In the preferred illustrative embodiment, the connector head is so mounted that its axes of rotation with respect to each arm intersect at a common point to thereby decouple the translational and rotational position equations of the system, whereby the positional location of the connector is defined solely by the longitudinal extension of each arm and its angular orientation is defined primarily by the angular orientation of each arm. This significantly decouples the equations of motion relating the extension and rotation of the arms, and their velocities, to the position, orientation, and velocity, of the connector head. This reduces the computational effort required to control the system and thus reduces cost and complexity of the system. For example, in calculating the positional and angular velocities of the connector from the corresponding velocities of the arms, a computation which must be performed repeatedly during movement of the connector, it reduces the computational task from inversion of a six-by-six matrix to that of inverting three three-by-three matrices.

Similarly, in the preferred illustrative embodiment, drive motors are mounted on each arm adjacent their connection to the frame for longitudinally extending and rotating each arm to thereby position the connector head at a desired location and with a desired orientation. This positioning of the drive motors greatly minimizes the inertia of the system, and thereby minimizes its response time, since it removes the motors (and thus their mass) from the vicinity of the connector. However, for some applications, it is desirable that the orientation of the tool attached to the connector head be controlled at the connector itself and independently of arm rotation. For example, in drilling a workpiece, a drill motor is attached to the connector head and the drill bit is rotated with respect to the robotic frame. In this case, rapid rotation of the drill bit via one of the arms may be less desirable than controlling the rotation at the connector itself. This may require that one of the arms be restricted in rotation about its longitudinal axis so as to provide the requisite reaction torque for operation of the drill. In such a case, the drill housing may be incorporated in the connector structure itself so as to provide only two degrees of rotational freedom of the connector with respect to the arms, namely, about axes transverse to the longitudinal axis of one of the arms but not about an axis coincident with that arm.

Similarly, in various other applications it may be found desirable to control the angular orientation of the connector head by control means attached to the head itself. For example, where motion through a large volume is required (e.g., in contouring large parts, in painting large objects such as automobile bodies, etc.) the arms must be long and thus heavy, thereby requiring substantial torque to rotate them so as to orient the connector. In such a case, orientation may be accomplished by coupling the connector to the arms through one or more motors which rotate the connector head with respect to a given arm by a desired amount. This is accomplished, however, at the expense of increased weight at the connector itself.

The invention described herein allows the user to establish the angular orientation of the connector head in space. This is accomplished by establishing the orientation of the head with respect to sets of axes, not parallel to a common plane, associated with each arm. These axes are a torsional axis and a pair of axes transverse to the torsional axis. In the simplest case, the torsional axis is simply the longitudinal axis of the arm. In other cases described herein, the torsional axis may be offset from the arm. Most commonly the torsional axis associated with a given physical arm will maintain a fixed orientation with respect to the arm. In some cases, however, as described in detail below, the orientation of the torsional axis of an arm with respect to that arm may vary as the connector head moves from point to point.

In particular, as described in detail herein, the desired orientation of the connector head with respect to the frame is established by restricting rotation of the head about at least three arm axes. The restriction is accomplished, for each axis so restricted, either by controlling rotation of the head about the axis actively by a user-commanded control means or by precluding its rotation about the axis structurally.

A three point ("tripod") mounting system is used for the arms; this provides a stiff structure, capable of moving substantial loads of high speeds.

The design readily lends itself to implementation with any of several different degrees of freedom to suit particular needs. Thus, the preferred embodiment described herein has six degress of freedom (three translational, three rotational) but any one or more of these may readily be constrained to thereby provide a manipulator more particularly adapted to a given purpose. For example, in assembling parts on an essentially planar surface, it is not necessary to vary the orientation of the head relative to the workpiece plane. In this case, the preferred embodiment of the manipulator may be constructed so as to structurally preclude or controllably restrict rotation of the head about two of the arm axes to thereby constrain the head to maintain a fixed orientation (relative to the frame) with the working plane. Further, each arm is essentially the same as each other arm, and thus the system can be constructed on a mass-assembly basis, comparatively inexpensively, without highly critical tolerances, and with a limited number of different components.

DETAILED DESCRIPTION OF THE INVENTION

The foregoing and other and further features and objects of the invention will more readily be understood from the following detailed description of the invention, when taken in conjunction with the accompanying drawings in which.

Figure 1:
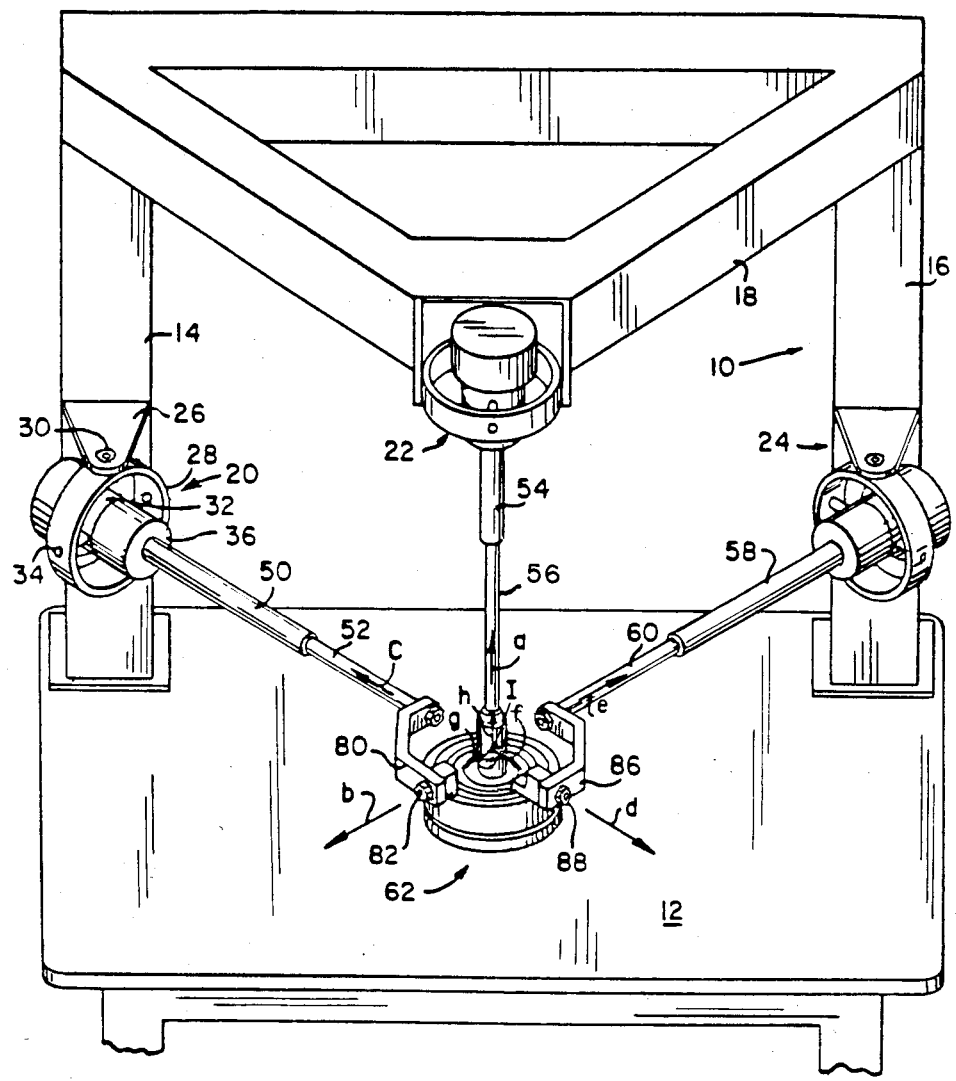
FIG. 1 is a view in perspective of a robotic manipulator constructed in accordance with the invention.

In FIG. 1, a frame 10 has a base 12, vertical pedestals 14, 16, and a triangular platform 18. Gimbal mounts 20, 22 and 24 are fixed to the pedestals 14, 16 and the platform 18, respectively. Gimbal mount 20 has a first yoke 26 in which a second yoke 28 is pivotally mounted by means of a vertical pivot 30. An electric motor 32 is pivotally mounted within yoke 28 by means of pivot 34, and the frame of a second electric motor, 36, is mounted on the shaft of motor 32 for rotation therewith.

An arm 50, having an extensible arm portion 52, is mounted concentric with the shaft of motor 36. Arm portion 52 has a rear portion 53 thereof centerbored and internally threaded to mate with a correspondingly threaded screw 55 formed on the shaft of motor 36. A pin 57, connected to an inner wall of arm 50, rides in a longitudinal slot 59 in arm 52 to prevent rotation of arm 52 with respect to arm 50. Control elements in the form of motors 32 and 36 are connected to a controller (not shown), preferably containing a computer for supplying various positional and rotational drive commands to the motors. Each motor is preferably energizeable independently. Motor 32 controls the angular orientation of arm 52, while motor 36 controls its longitudinal extension.

In similar fashion, gimbal 22 has extending therefrom an arm 54 and extensible arm portion 56, while gimbal 24 has extending therefrom an arm 58 and extensible arm portion 60. The construction of the gimbals 22, 24, and their associated arm translation and rotation drives are similar to that of the gimbal 20 and its corresponding drives, and thus these will not be described in detail.

As may be seen from FIG. 1, each arm is free to rotate with respect to the frame about three axes. A first of these comprises the longitudinal axis of each arm, e.g., axis "a" for arms 54, 56; axis "e" for arms 58, 60;

and axis "c" for arms 50,52. The second and third axes comprise mutually transverse axes defined by the respective pivots and themselves defining, or parallel to, a respective plane transverse to the corresponding arm axis. The arms 52, 56, and 60 terminate in a head 62 which is shown in full detail in FIG. 2. Head 62 has an inner member 64, an intermediate member 66, and an outer member 68. Members 64 and 66 are separated by ball bearings 70, while members 66 and 68 are separated by ball bearings 72. A connector 74 (FIG. 2), to which a tool is to be attached, is rigidly connected to inner member 64 and rotates with that member independent of members 66, 68.

Arm 52 is attached to the outer head member 68 by means of a coupling bracket 80 which is rigidly fixed at one end thereof to the arm 52 and which is pivotally mounted at the other end thereof for rotation about a bearing pin 82. Similarly, arm 60 is connected to the intermediate head member 66 by means of a coupling bracket 86 which is rigidly attached to arm 60 at one end thereof and which is pivotally mounted for rotation about a bearing pin 88 at the other end thereof. Accordingly, connector head 74 can rotate with respect to arm 52 about a first axis "h" concentric with the axis of rotation of inner member 64, and about a second axis co-linear with the axis of bearing pin 82; these axes define a plane that is transverse to the longitudinal axis "c" of arm 52. ("Transverse" is herein to be understood as meaning oriented at a non-zero angle such that the line or axis to which the plane is transverse lies outside the plane). Since bracket 80 is rigidly coupled to arm 52, connector head 74 is precluded from rotating with respect to arm 52 about the longitudinal axis "c" of this arm, but can rotate with this arm about this axis. Similarly, connector head 74 rotates with respect to arm 60 about the first axis "h" and about a second axis "d" co-linear with the axis of bearing pin 88; these axes define a plane transverse to the longitudinal axis "e" of arm 60. Connector head 74 is precluded from rotating with respect to arm 60 about the axis "e", but can rotate with the arm 60 about this axis.

Coupling member 64 is coupled to arm 56 by means of a universal joint shown, for purposes of illustration only, as formed from a first pin 90 extending across a slotted jaw 92 at the lower end of arm 56 and a second pin 94 extending perpendicular to pin 90 and mounted in a slotted jaw 96 of a mounting shaft 98 fixed to the connector head 74. Pins 90 and 94 are pivotally mounted with respect to each other at their intersection to form a universal joint providing rotary motion of connector 74 with respect to arm 56 about a pair of axes coincident with the longitudinal axes "f", "g", respectively of the pins 90, 94. These axes define a plane transverse to the longitudinal axis "a" of arm 56 and connector 74 thus rotates with respect to arm 56 about axes lying in this plane. Conversely, connector 74 is restrained from rotation with respect to arm 56 about the longitudinal axis "a" of this arm, but does rotate with this arm about this axis.

The location and orientation of the connector 74 is defined by the longitudinal extension and angular orientation of each of the arms 52, 56, 60. Further, in the preferred embodiment illustrated herein, the axes of rotation of the connector 74 with respect to the arms are so located as to intersect at a common point (point "I" in FIGS. 1 and 2). This decouples the translational and rotational coordinates of the respective arms such that the positional location of the connector 74 is defined solely by the longitudinal extension of the arms, while the angular orientation of the connector is defined principally by the rotational state of these arms with respect to an initial zero reference point. This greatly simplifies control systems for the robotic manipulator described herein, as it minimizes the computation that must be undertaken to determine the necessary longitudinal extension and angular orientation of each of the arms in order to position the connector in a desired location and with a specified orientation. Thus, development of the control system is simplified, and the system itself is able to operate more expeditiously.

The arms 52, 56, 60 of the robotic manipulator described above form a tetrahedral figure in space, the arms lying along three converging edges of the tetrahedron and the connector lying at their apex. This provides an especially strong and rigid configuration supporting the connector and the tools attached to it, and allows one to subject it to relatively high accelerations and decelerations without excessive vibration and extended settling time. Further, it allows the carrying of a substantial load by the connector. Thus, the manipulator is particularly suited for applications such as parts assembly, numerically controlled machining, part sorting, part transfer, and the like.

Figure 3:
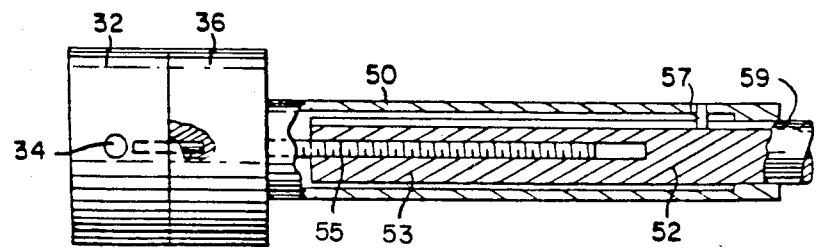
FIG. 3 is a view of one type of driving means for the arms.
Figure 4:
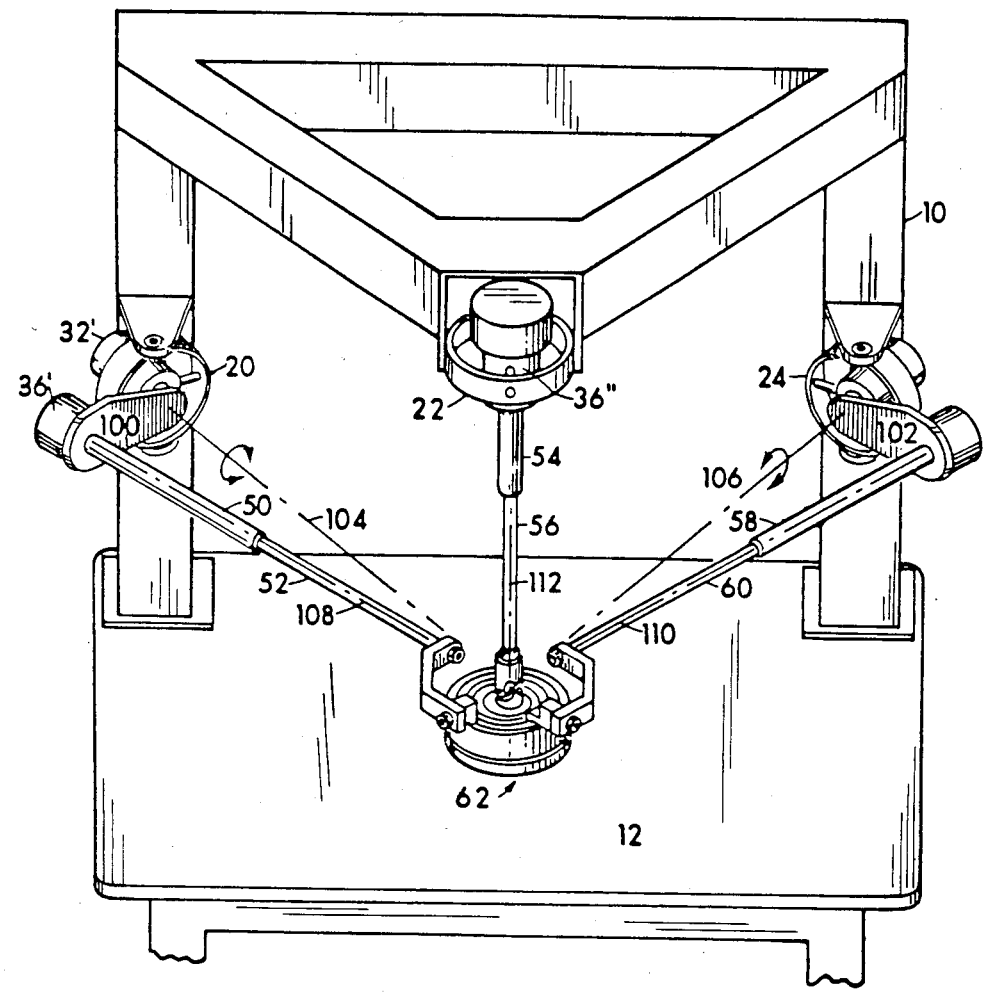
FIG. 4 is an alternative embodiment of my invention in which two of the arms of the structure are laterally offset from their mounting gimbals in order to alter the horizontal sweep of the connector.

Turning now to FIG. 4, an alternative illustrative embodiment of my invention is shown. The elements of FIG. 4 are similar, in most respects, to those of FIG. 1 except that the arms 50 and 58 (and their corresponding arm extensions 52 and 60) are laterally offset from gimbal mounts 20 and 24 by means of arm brackets 100 and 102, respectively. One end of arm bracket 100 is fixed for rotation with the shaft of a motor 32' (corresponding to motor 32 of FIG. 1), while the other end of the arm bracket carries a motor 36' (corresponding to motor 36 of FIG. 1) which longitudinally extends and retracts arm 52 within arm 50 in the manner previously described in connection with FIGS. 1 and 3. Arm bracket 102 is connected in a similar fashion to gimbal mount 24 and arm 58 and arm extension 60, and need not be described further.

With the arrangement shown in FIG. 4, the arms 52 and 60 rotate about effective axes of rotation 104, 106, respectively, as well as about axes established by their gimbal mountings; they translate inwardly and outwardly along longitudinal axes (108, 110) coincident with the arms themselves. As was previously the case, arm 54 rotates about axes defined by its gimbal 22 and parallel to a plane transverse to its longitudinal axis, as well as about its longitudinal (arm) axis 112. It also translates along the axis 112 in response to operation of its arm extension motor 36.

In contrast to the embodiment shown in FIG. 1, the effective longitudinal axes of rotation of the arms 52 and 60 are displaced from the actual respective longitudinal axes of these arms. This arrangement modifies the horizontal sweep of the connector to allow its movement to positions closer to the vertical posts of the frame 10 itself. However, this advantage is achieved at the expense of increasing the complexity of the control equations for positioning and orienting the connector head.

Figure 5:
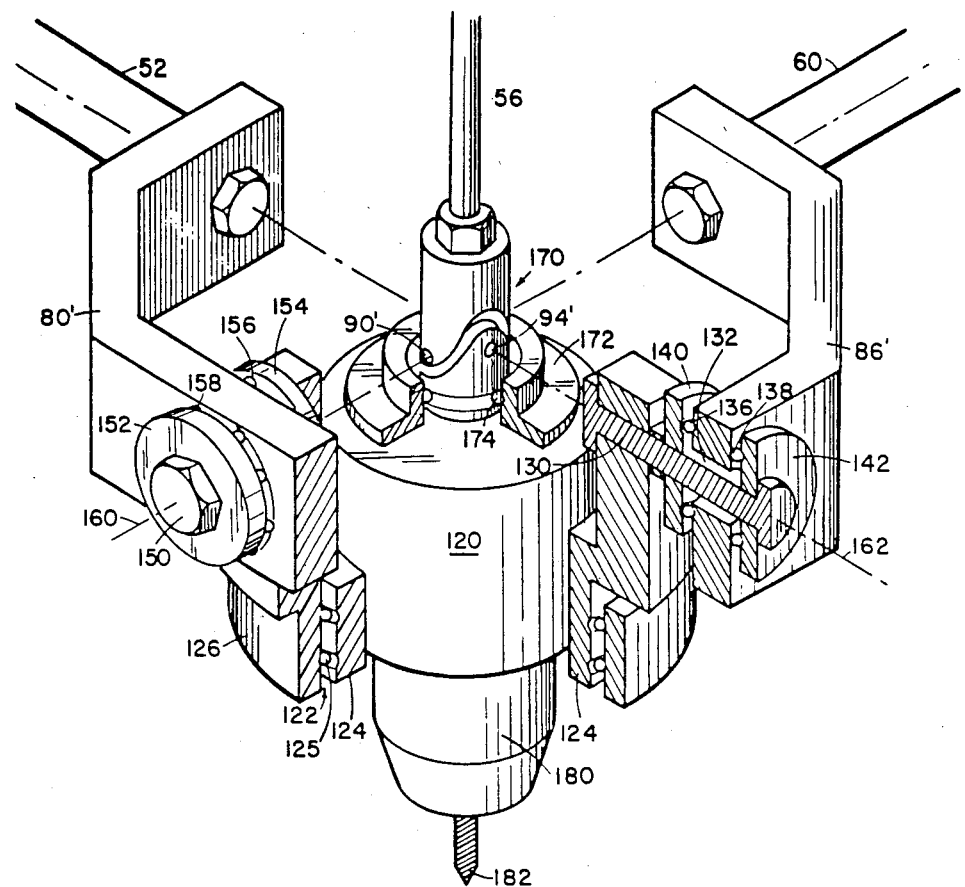
FIG. 5 is a view of a further embodiment of my invention illustrating its use in connection with a drilling application.

FIG. 5 is an enlarged view of the coupling head and its related attachment structure to the arms showing an illustrative embodiment of the invention which is particularly useful in applications involving drilling of a part. In such an application, it may be impractical to drive the bit through one of the arms because of the increased rotational inertia this would create. Accordingly, the rotational freedom of the drill with respect to one of the arms is restrained, and the drill bit is driven at the connector itself. In FIG. 5, the arm extensions 52, 56 and 60 are mounted at the frame end in the manner shown in FIG. 1 or FIG. 4. At the connector end, they connect to an electric drill 120 via a coupling head 122 having inner and outer coupling members 124 and 126, respectively. The coupling member 124 is fixedly connected to the drill body 120 at one end thereof, and is rotatably connected to an arm bracket 86' (and thus arm 60) at the other end thereof by means of a pin 130 extending through a channel 132 in bracket 86' and inner and outer bearings 136, 138 and corresponding bearing plates 140, 142, respectively. The body 120 serves the same function as head 62 of FIG. 2, that is, it couples the tool (here the drill bit) to the arms through the connector.

Similarly, outer member 126 is mounted for rotation with respect to bracket 80' (and thus arm 52) by means of a pin 150 extending through a channel (not shown) in bracket 80' and fixed to outer and inner bearing plates 152, 154 confining inner and outer bearings 156, 158, respectively. The inner bearing plate 154 is rigidly (non-rotatably) connected to member 126 which thus rotates about a longitudinal axis defined by the longitudinal extent of pin 150 (i.e., axis 160). In like fashion, coupling member 124 rotates about the longitudinal axis 162 of pin 130.

Figure 2:
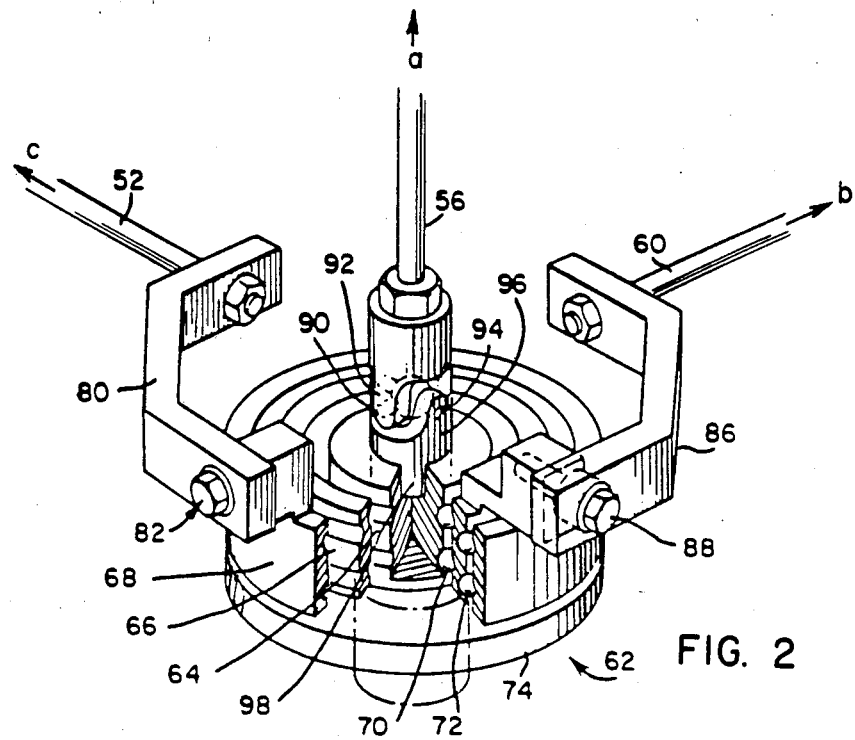
FIG. 2 is a view in perspective of the manipulator head of FIG. 1 with portions broken away for purposes of illustration.

A universal joint connects coupling head 122 to arm 56. This joint is constructed in the same manner as indicated in FIGS. 1 and 2 and has first and second pins 90' and 94', respectively, extending transversely across slotted jaws so as to allow rotation of the member 122 about the axes of these pins. Unlike the arms 52 and 60, rotation of the head 122 with respect to the arm 56 is provided by a collar 172 which encloses a bearing 174.

The drill body 120 has a rotating head 180 and a drill bit 182. The reaction torque generated by drill bit 182 is taken up by flexion of arm 60. In particular, the torque generated by the action of the drill creates a turning moment about arm 56. This turning moment is transmitted through inner member 124 and thence through pin 130 to bracket 86' and arm 60.

In certain applications, it is desirable to control the orientation of the connector by means other than arm rotation. For example, in spray painting operations, a relatively light tool (e.g., a paint spray head) may be moved over substantial distances (e.g., the extent of an auto body). In such an application, the arms are necessarily made thicker and thus more massive, in order to sustain even their own weight in spanning the extended distances involved. In such a case, the arms present a substantial rotational inertia, and angularly orienting the connector head by rotating the respective arms will lengthen the response time of the system as well as increase the required driving power. For such applications, therefore, it may be desirable to control the head orientation at the head itself instead of at the frame.

Figure 6:
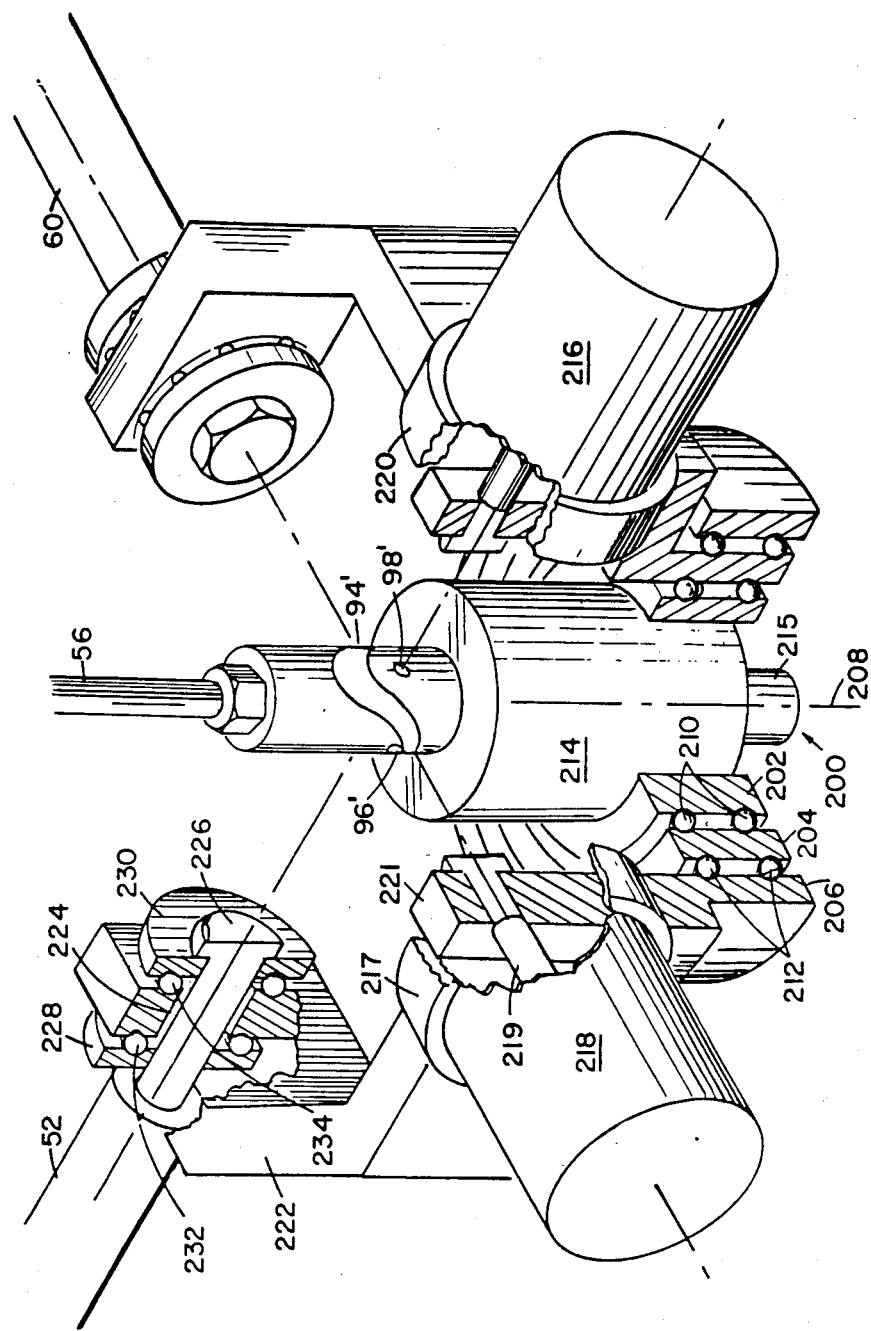
FIG. 6 is a view of still another embodiment of my invention illustrating control of the rotational orientation of the connector by controllers positioned at the connector head itself.

An embodiment of my invention in which this is achieved is shown in FIG. 6. As there shown, a coupling head 200 has inner, middle and outer members 202, 204 and 206, respectively. These members rotate with respect to each other about a first axis 208 via bearings 210 and 212. A first motor 214 is fixedly attached to inner member 202; a second motor 216 is fixedly attached to middle member 204; and a third motor 218 is fixedly attached to outer member 206. The tool or other device which is to be positioned and angularly oriented in space is attached to the rotatable shaft 215 of motor 214 which serves as the connector head in this case. The motors are controllably energized by an operator or a programmed controller to angularly orient the connector head with respect to the arms as will now be described in detail.

Motor 214 is attached to arm extension 56 via a universal joint 94' having transverse pins 96', 98' about which the motor casing 214 and head 200 can rotate. The shaft 219 of motor 218 is fixedly connected to a post 221 of outer connector member 206. Motor 218 is rotatably coupled to arm 52 via a collar 217 and a bracket 222 having a channel 224 extending through it and through which a bolt 226 extends and screws into a threaded endface of arm 52. Interposed between the endface of arm 52 and block 222 is a first bearing plate 228 which is preferably rigidly attached (e.g., welded) to the end face of arm 52. A second bearing plate 230 is interposed between the head of bolt 226 and the bracket 222. The bearing plates 228 and 230 are separated from the bracket 222 by bearings 232, 234, respectively. With this arrangement, the bolt 226, and bearing plates 228 and 230, remain fixedly attached to arm 52 while connector bracket 222, and the head 200 connected to it, is free to rotate about a longitudinal axis through arm 52 by virtue of the bearings 232, 234. Motor 216 is rotatably connected to arm 60 in a manner similar to that in which motor 218 is connected to arm 52 and the connection thus need not be described in further detail.

The structure shown in FIG. 6 positions the shaft 215 at a location in space defined by the extension of the arms 52, 56, and 60 but orients the shaft with respect to the frame (as well as with respect to the arms) in a manner determined by the angular orientation of the shafts of motors 214, 216 and 218. Assuming that the load is comparatively light, these motors may be small instrument motors and thus not add significantly to the weight presented at the connector head.

In the embodiments of FIGS. 1 through 5, the arm-to-connector coupling is such that rotation of the connector head relative to the arms about the longitudinal axes of the respective arms is precluded with respect to one or more of the arms. Thus, in FIG. 1, the head cannot rotate about any longitudinal arm axis independently of the arm but can only rotate with an arm about its axis. The same is true in Fig. 4; note, however, that the torsional axis and the longitudinal arm axis do not coincide in FIG. 4. In FIG. 5, the head is similarly constrained from rotation about the axes of arms 52 and 60 separate from the arms themselves, although this is not true with respect to rotation about the axis of arm 56, since the arm-to-connector coupling for that arm is via bearing 174 so as to allow the drill bit to be rapidly rotated about the axis of arm 56 without also rotating that arm. Even then, however, the angular orientation of the tool (here, drill bit) about the arm axis, while no longer precluded, is still restricted, that is, independently controlled by the operator. Finally, in FIG. 6, the angular orientation of the connector head with respect to the arms about each of the arm axes is controlled by the operator by means of the signals applied to the motors 214, 216, 218. Thus rotation of the head with respect to the arms about the arm axes in each instance is restricted, that is, controlled by the operator. Accordingly, the position and orientation of the head are independently controllable by the operator.

CONCLUSION

From the foregoing, it will be seen that I have provided an improved robotic manipulator. The manipulator is of the non-cantilevered type and has a plurality of arms supported from a solid frame in a three-point mounting so as to provide high stiffness to a connector head attached to it and carrying a tool or part to be positioned or oriented. This enables the movement of substantial loads at comparatively high speeds.

In the preferred illustrative embodiments, the driving elements for the positioning and orientation are located remote from the effective rotational axes of the connector to thereby minimize the mass, and the consequent inertia, of the structure at the location of the connector; this facilitates high speed motion of the connector and the tools attached to it. The driving means can advantageously be located immediately adjacent the mounting means joining the arms to the frame. However, they can also be positioned, in accordance with the needs of the user, at locations remote from this location, if desired, to counterbalance loads applied to the connector head or for other reasons. The design of the present invention thereby provides great flexibility in the location of the driving elements.

The arms of the manipulator are quite simple, are essentially identical in construction and use no parts of critical tolerance. Thus they can be manufactured with mass-production techniques at low cost and readily assembled together. The design is adapted to provide varying degrees of freedom merely by restricting the extension or rotation of one or more of the arms.

In the preferred embodiment, the coupling structure interconnecting the connector and the respective arms is such that the effective axes of rotation of the connector with respect to the arms intersect at a common point. This substantially decouples the positional and rotational co-ordinates of the arms such that the equations of motion describing the motion of the connector in terms of the motion of the respective arms are simplified. Thus, the computations required to accurately control the position and orientation of the connector, and to bring it to a desired location and orientation, are simplified.

Finally, several alternative illustrative embodiments have shown the invention as modified to accomodate particular applications. Thus, in one alternative a set of arms are laterally offset to enhance movement of the connector closely adjacent the frame. In other embodiments, connector head orientation is controlled by one or more rotation devices (motors) at the coupling head which are selectively energized by the operator or, more likely, by a programmed controller. Various other modifications may be made to accommodate the invention herein to specific applications and it will be understood by those skilled in the art that the foregoing is illustrative only.

Having illustrated and described my invention, I claim:

1. A robotic manipulator, comprising
A. a frame,
B. a plurality of arms affixed to said frame, each arm extensible along a longitudinal axis and mounted for rotation about axes parallel to a plane transverse to said longitudinal axis, as well as about an axis transverse to said plane,
C. a connector head for attachment to a tool,
D. coupling means coupling each said arm to said connector head, said coupling means providing rotation of said connector with respect to each said arm about axes parallel to a plane transverse to the longitudinal axis of said arm and restricting rotation of said connector with respect to at least one of said arms about axes transverse to said plane,
E. said manipulator positioning said connector at a desired location and angular orientation by controllably extending said arms and rotating said head.

2. A manipulator according to claim 1 in which one of said arms is connected to said frame by a doubly-articulated joint.

3. A manipulator according to claim 1 in which a first of said coupling means comprises a doubly articulated joint having a first portion thereof mounted for rotation with said connector about an axis transverse to a first connector axis and a second portion thereof connected to said arm and mounted for rotation about an axis transverse to said first connector axis.

4. A manipulator according to claim 3 in which a second and third of said coupling members each includes a first member mounted for rotation with respect to said connector about said first connector axis and a second member connected to said first member and mounted for rotation about an axis transverse to said first connector axis.

5. A manipulator according to claim 4 in which said second and third coupling members are mounted to rotate said connector about axes orthogonal to said first connector axis in response to rotation of the respective arms attached to the said connector.

6. A manipulator according to claim 1 in which said axes comprise, for each arm, an axis coincident with said arm and a pair of axes defining a plane transverse to said longitudinal axis.

7. A manipulator according to claim 6 which includes drive means on at least two of said arms for longitudinally extending said arms and positioning said connector at a predetermined location.

8. A manipulator according to claim 1 which includes drive means on the ends thereof adjacent said frame for extending and rotating said arms.

9. A manipulator according to claim 8 in which said drive means include a first motor for extending a corresponding arm and a second motor, operable independently of said first motor, for rotating a corresponding arm.

10. A manipulator according to claim 1 in which said arms are three in number and are positioned on said frame in tetrahedral relationship for rigidly supporting said connector head.

11. A robotic manipulator, comprising
A. a frame mounting one end of at least three longitudinally extensible arms for motion through a substantial solid angle, pairs of said arms defining separate planes; and
B. coupling means joining the other end of each of said arms to a connector for motion through a corresponding substantial solid angle, said coupling means including a first member joined to a first of said arms through a first joint rotatable through a substantial solid angle and second and third members joined to second and third arms, respectively, through respective joints rotatable about non-parallel axes, and means mounting said members for rotation with respect to each other about a common axis transverse to the plane defined by said non-parallel axes.

12. A manipulator according to claim 11 in which said first joint comprises a universal joint.

13. A manipulator according to claim 11 in which said first joint comprises a constant velocity joint.

14. A manipulator according to claim 11 in which each said arm is mounted for rotation with respect to said frame about a first axis coinciding with the longitudinal axis of said arm.

15. A manipulator according to claim 14 in which said arms are mounted such that a second axis of rotation of each arm is perpendicular to the first axis of rotation of the corresponding arm.

16. A manipulator according to claim 15 in which said arms are mounted such that a third axis of rotation of each arm is transverse to the first and second axes of rotation of the corresponding arm.

17. A manipulator according to claim 16 in which said arms are mounted such that the axes of rotation of each said arm intersect at a common center.

18. A manipulator according to claim 11 in which said arms are mounted on said frame by means of a universal joint.

19. A manipulator according to claim 11 which includes drive means connected to each arm at the end adjacent said frame for extending said arms.

20. A manipulator according to claim 19 in which said drive means includes means for rotating said arms.

21. A manipulator according to claim 11 in which said member is mounted on said arms to define three principal axes of rotation of said connector with respect to said arms, which axes intersect at a common point to thereby decouple the positional equations from the rotational equations of motion of said connector.

22. A manipulator according to claim 21 which includes first drive means on each said arm for controllably rotating said arms and second drive means on at least two of said arms for controllably extending said arms longitudinally.

23. A manipulator according to claim 21 which includes drive means on each arm, adjacent the mounting location of said arm on said frame, for controllably positioning said connector by longitudinally extending and rotating each arm by predetermined amounts.

24. A robotic manipulator comprising
A. a connector to be positioned at a selected location and having a head for holding a tool
B. a frame
C. first, second, and third longitudinally extensible noncoplanar arms, each mounted on said frame for rotation with respect to said frame about a plurality of axes, and
D. means coupling each said arm to said connector for rotating said connector head with respect to said arm about at least two separate axes for each arm, said axes including at least a first transverse axis for each arm and including at least a second transverse axis for at least one of the arms, said coupling means restricting rotation of at least one of said arms about at least one axis for said arm.

25. A manipulator according to claim 24 in which said coupling means is configured to orient each said axis for intersection at a common point such that the position of said connector is defined by the longitudinal extension of each said arm and the orientation of said connector is defined substantially by the orientation of each said arm.

26. A manipulator according to claim 24 in which said coupling means comprises first, second and third collars connected to said first, second, and third arms, respectively, and mounted for rotation relative to each other about a first common axis coincident with a first axis of said connector; first and second pivot means interconnecting said first and second arms and said first and second collars, respectively, and mounted to rotate said connector with respect to said arms about axes defined in a plane orthogonal to said first axis; and a universal joint connected to a third arm and providing rotation of said connector about a pair of axes defined in a plane transverse to said first axis.

27. A manipulator according to claim 26 which includes drive means mounted on at least two of said arms for longitudinally extending said arms by defined amounts.

28. A manipulator according to claim 26 which includes drive means mounted on each said arm adjacent said frame for rotating each said arm about its longitudinal axis.

29. A manipulator according to claim 26 which includes drive means mounted on each said arm adjacent said frame for rotating each said arm about said longitudinal axis and for independently extending it along said axis.

30. A manipulator according to claim 21 which includes an electric motor mounted on each said arm adjacent point of mounting on said frame for rotating said arm about said longitudinal axis.

31. An articulated structure according to claim 21 which includes at least one electric motor mounted on each said arm adjacent said frame for rotating said arms about said longitudinal axis and for independently extending it along said axis.

32. A manipulator according to claim 26 in which each said arm about which said connector rotates with respect to said arm is positioned to intersect the other said axes at a common point.

33. A manipulator according to claim 24 which includes first and second arm brackets connected to first and second arms, respectively, for laterally offsetting the longitudinal axes of the first and second arms from the effective rotation axes of said arms.

34. A robotic manipulator according to claim 24 in which said coupling means includes:
A. first and second connector elements,
B. means connecting said first connector element to a first of said arms and providing rotation of said connector about a first axis transverse to said arm but restricting rotation with respect to said arm about a second axis transverse to said arm;
C. means connecting said second connector element to a second of said arms and providing rotation of said connector about a first axis transverse to said arm.

35. A manipulator according to claim 34 in which said connector elements are mounted for rotation respect to each other about a common axis.

36. A robotic manipulator according to claim 24 in which said coupling means includes:
A. first, second and third connector elements,
B. means connecting said first connector element to a first arm by means of a controlled rotation element selectively fixing the rotation between said element and said arm about an axis transverse to said arm;
C. means interconnecting said second connector element to a second arm by means of a controlled rotation element selectively fixing the rotation between said element and said arm about an axis transverse to said arm; and D. means interconnecting said third connector element to a third arm by means of a controlled rotation element selectively fixing the rotation between said third arm and said head.

37. A manipulator according to claim 36 in which said connector elements are mounted for rotation with respect to each other about a common axis.

38. A robotic manipulator according to claim 1 which further comprises drive means on said arms for extending and rotating said arms, and a controller for supplying drive commands to the drive means.

39. A robotic manipulator comprising
A. a frame,
B. first, second and third arms, each extensible along a longitudinal arm axis,
C. means mounting a first end of each arm for rotation with respect to said frame about a first pair of axes transverse to the respective arm,
D. a connector head for attachment to a tool
E. means interconnecting a second end of each arm to said connector, said interconnecting means structured to provide rotation of said head with respect to said arms about a first transverse axis with respect to each arm and about at least an additional transverse axis for at least one of said arms and to restrict rotation of said head about at least one axis for at least one arm.

40. A robotic manipulator comprising
A. a frame
B. at least three non-coplanar arms, each extensibly connected to said frame at one end thereof and mounted to rotate about axes transverse to the said arm,
C. means for controllably extending each arm along the longitudinal axis thereof in response to drive commands applied thereto,
D. means coupling each said arm to a connector head at the other end thereof, said coupling means structured to provide rotation of said head with respect to each arm about at least a first arm axis and to provide rotation of said head with respect to at least one of said arms about at least three arm axes, and to restrict rotation of said head about at least one arm axis.

41. A manipulator according to claim 40 in which said coupling means includes
(a) a first coupling member for receiving a tool thereon, said member being connected to rotate with first and second selected arms about their respective torsional axes, connected to rotate with respect to said arms about axes transverse to said torsional axes, and
(b) a second coupling member connected to rotate with a third arm about the torsional axis of said arm and connected to rotate with respect to said arm about axes transverse to said torsional axis.

42. A manipulator according to claim 41 in which said first coupling member includes a motor for rotating a tool connected thereto.

43. A manipulator according to claim 40 in which said coupling means includes a rotation controller attached to each arm.

44. A manipulator according to claim 40 in which said coupling means includes at least first, second and third coupling members connected to first, second and third arms, respectively, and controlling rotation of said head about the respective torsional axes of said arms.

45. A robotic manipulator comprising
A. a frame,
B. a connector including a head for mounting a workpiece thereon,
C. first, second and third arms rotatably mounted on said frame, and extensible to position said head at a selected position in space when coupled thereto, each said arm having associated therewith a torsional axis and first and second axes transverse thereto,
D. coupling means interconnecting said arms and said head, said coupling means structured to accommodate rotation of said head about at least one of said axes with respect to each arm and to restrict rotation of said head about at least three of said axes, at least one of which is either provided with controlled rotation thereabout or is parallel to a torsional axis.

46. A manipulator according to claim 45 in which said coupling means is structured to provide controlled rotation about at least one of said axes.

47. A manipulator according to claim 46 in which said coupling means restricts rotation about at least one of said torsional axes.

48. A manipulator according to claim 47 in which said coupling means restricts rotation about at least two of said torsional axes.

49. A manipulator according to claim 48 in which said coupling means restricts rotation about three of said torsional axes.

50. A manipulator according to claim 45 in which said coupling means is structured to provide controlled rotation about at least two of said axes.

51. A manipulator according to claim 50 in which said coupling means restricts rotation about at least one of said torsional axes.

52. A manipulator according to claim 51 in which said coupling means restricts rotation about at least two of said torsional axes.

53. A manipulator according to claim 52 in which said coupling means restricts rotation about at least three of said torsional axes.

54. A manipulator according to claim 45 in which said coupling means is structured to provide controlled rotation about three of said axes.

55. A manipulator according to claim 54 in which said coupling means restricts rotation about one torsional axis.

56. A manipulator according to claim 55 in which said coupling means restricts rotation about two torsional axes.

57. A manipulator according to claim 56 in which said coupling means restricts rotation about three torsional axes.

58. A manipulator according to claim 45 in which said coupling means includes means restricting rotation about at least one torsional axis.

59. A manipulator according to claim 45 in which said coupling means includes means restricting rotation about at least two torsional axes.

60. A manipulator according to claim 45 in which said coupling means includes means restricting rotation about at least three torsional axes.

61. A manipulator according to claim 60 in which said means restricting rotation comprises means precluding rotation about at least three torsional axes.

62. A manipulator according to claim 60 in which said means restricting rotation comprises means precluding rotation about at least two torsional axes.

63. A manipulator according to claim 45 in which said coupling means includes means restricting rotation about a first torsional axis and precluding rotation about second and third transverse axes, said axes being associated with separate arms.

* * * * *